United States Patent Office 2,829,859
Patented Apr. 8, 1958

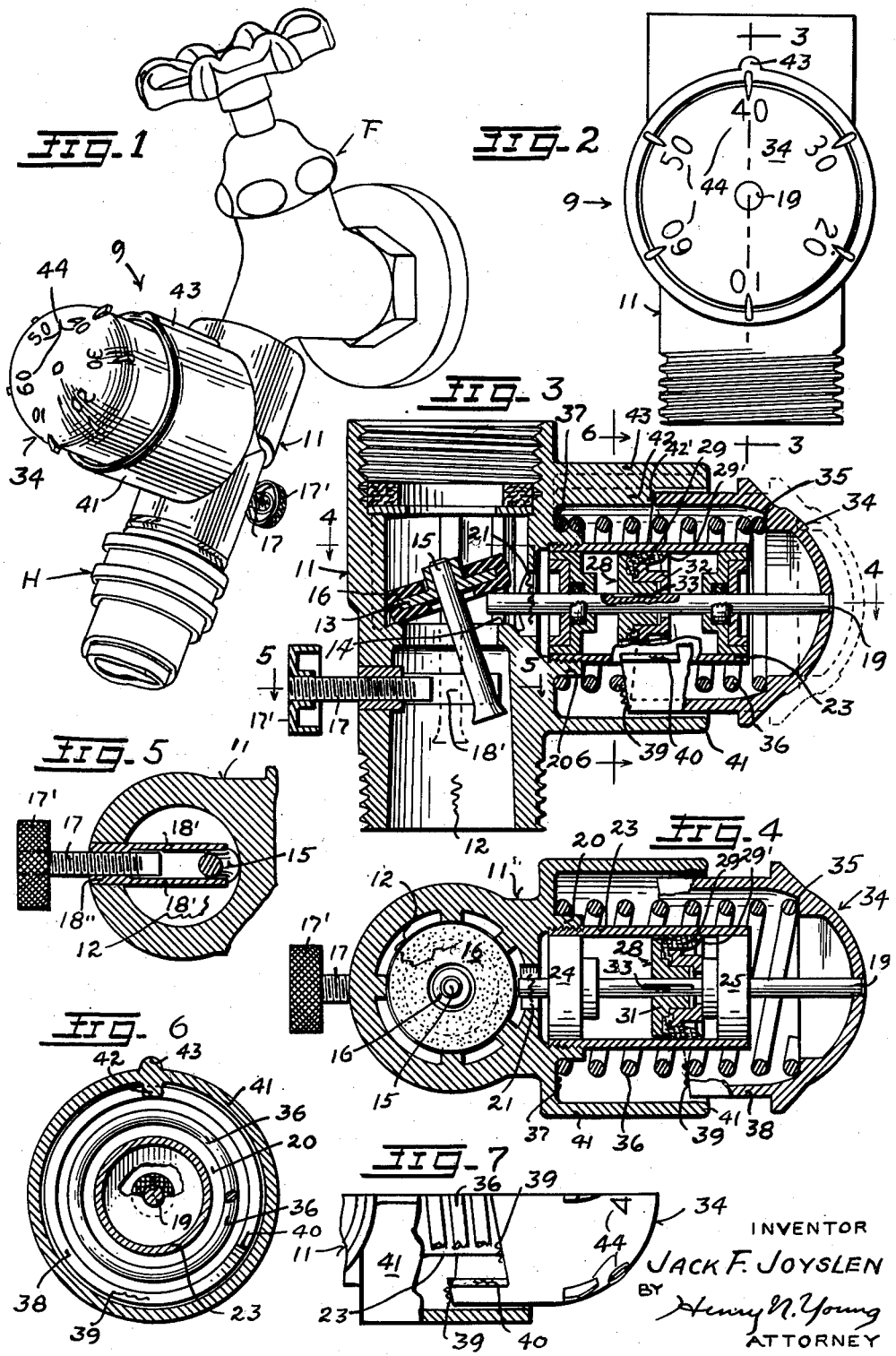

2,829,859

MANUALLY RESET TIME-CONTROLLED VALVE

Jack F. Joyslen, Walnut Creek, Calif., assignor to Fred J. Morris Company Incorporated, a corporation of California Application August 6, 1954, Serial No. 448,218

6 Claims. (Cl. 251—54)

The invention relates to a device for effecting a predetermined timing of an operation, and particularly the flow of a stream of a liquid through a valve.

An object of the invention is to provide a fluid flow-control valve 5 in which the position of a valve disc is controlled in a particularly simple and effective manner.

A more specific object of the invention is to provide a fluid flow timer in which the timing of the fluid flow is effected independently of the controlled fluid.

Another object is to provide a timer of the character described which is spring actuated under hydraulic control.

A further object is to provide a timer of the character described in which the timing is adjustably variable in accordance with the setting of a directly associated indicator means.

An added object is to provide a timer of the character described having a particularly simple and effective timing adjustment means directly associated with the indicator means.

A more general object is to provide a timing device of the character described which is adaptable to a wide range of useful applications thereof.

The invention possesses other objects and features of advantage, some of which, with the foregoing, will be set forth or be apparent in the following description of a typical embodiment and application thereof, and in the accompanying drawings in which, Figure 1 is a perspective view showing a timing device embodying the features of invention as utilized in the structure of a controlled liquid flow valve which is interposed between the hose bib of a faucet and a hose connection.

Figure 2 is a side view of the valve assembly of Figure 1 providing a full face view of an adjustment indicator of the valve.

Figure 3 is a sectional view taken at the line 3—3 in Figure 2, the unit being conditioned for a timed flow of liquid therethrough.

Figure 4 is a section taken at the broken line 4—4 in Figure 3 when the valve is closed.

Figure 5 is a fragmentary section taken at the line 5—5 in Figure 3.

Figure 6 is a sectional view taken at the line 6—6 in Figure 3.

Figure 7 is a partially sectional fragmentary side view of the timer portion of the unit.

As particularly illustrated, the features of my invention are incorporated in a unitary valve assembly 9 having a body 11 providing a valved flow passage 12 in which a valve disc 13 normally engages an annular valve seat 14 provided in the passage 12 intermediately thereof. The passage bore at its intake end is internally threaded for connecting the body to a source of liquid represented by a faucet F, and the other body end is externally threaded for its engagement by a connection H for a hose or pipe discharge of received liquid from the valve. The present valve disc 13 is provided with a stem 15 extending axially therefrom in the flow direction for the passage 12, and the rim portion of the disc is enclosed in a suitable sheath 16 of rubber or the like which is arranged to seal the passage 12 against fluid flow therethrough when it fully engages the seat 14. At a point thereof beyond the seat 14, a screw 17 is threadedly mounted in the wall of the passage 12 for its projection radially against the stem 15 of the valve disc 13 for unseating the valve disc 13 by pushing the stem out of its normal axial position in the passage which it assumes when the valve it shut.

A rigid forked member 18 having sides 18' uniformly spaced to slidably receive the valve stem 15 between them has its base portion 18" suitably fixed in and through the passage wall, and threadedly mounts the screw 17. The arrangement is essentially such that an inward turning of the screw 17 to actuate its inner end laterally against the stem 15 may so displace the valve disc 13 that the latter is tilted away from its seat except at a contact point at the side of the flow passage at which the screw is mounted, said screw being provided with a knurled head 17' to facilitate its manual turning. In this manner, the flow passage is arranged to be maintained in open condition with respect to the valve seat and against the pressure of a supplied stream while, and only while, the screw 17 is set to deflect the valve stem 15 from its normal axial position in the flow passage 12.

An axially shiftable stop element comprising rod 19 of circular cross-section extends radially through and from the side wall of the passage 12 at the opposite side thereof from the screw 17 at a passage point just ahead of, or upstream of the seat 14, and said rod is variably projectible between the valve disc 13 and said seat as a stop which is laterally engageable by the disc to prevent a closing return of the displaced valve 13 to its normal sealed engagement with the seat 14 under the pressure of the fluid supplied to the flow passage 12 from the liquid source. After the rod 19 has been disposed to prevent a passage-closing disposal of the valve 13, the screw 17 is backed off to permit a normal axial disposal of the stem 15 and a full seating of the valve only after the rod 19 is withdrawn from its engagement with the valve disc. The withdrawal of the operatively set stop rod 19 is under automatic control of a spring-actuated hydraulic timing mechanism which is provided in and on a radial body extension 20 comprising an annular collar coaxial with the rod 19 at a side portion of the valve body 11; in the present structure, the collar 20 is directed oppositely from the valve-displacing screw 17 with respect to the body whereby the axes of the rod and screw are parallel and coplanar in a plane including the axis of the flow passage 12, and the wall portion within the circle of the collar bore is provided with an axial opening 21 which freely receives the rod.

It will now be noted that the collar 20 fixedly and sealedly mounts a cylinder 23 of circular cross-section within it by a threaded engagement of its inner end within the collar bore. Circular head assemblies 24 and 25 sealedly and fixedly close the inner and outer cylinder ends respectively, said heads being centrally perforated and slidably and sealedly receiving the stop rod element 19. As particularly illustrated, the inner cylinder head 24 comprises an inner member nested within an outer member which is cooperative with the first member to provide an annular space containing a suitable packing ring about the rod 19. The outer cylinder head end 25 is made up of sections complementarily corresponding to the sections of the inner end wall 24 and enclosing a suitable packing ring. The rod-sealing arrangement is essentially such that a charge of a suitable liquid, as oil, in the cylinder space, may not escape along the rod as the same is reciprocated.

A piston 28 is fixedly mounted on the rod 19 within the space of the cylinder 23 between its head ends 24 and 25, and mounts a cup leather 29, or the like, having its tapered sealing edge 29' directed toward the outer cylinder head 25, whereby the piston may be moved toward the inner cylinder end to a limit imposed by the end wall 24 by forcing a portion of the liquid charge past the sealing edge (lip) 29' of the cup leather which thereby operates as a one-way valve between the cylinder space portions separated by the movable piston 28. To permit an outward movement of the inwardly disposed piston 28 to a limiting position imposed by its contact with the outer cylinder head 25, a bleeder passage constantly connects the cylinder space portions at the opposite sides of the piston for permitting only a relatively slow movement of the liquid charge in the cylinder between the cylinder spaces defined at opposite sides of the cylinder-partitioning piston, whereby the viscosity of the liquid in the cylinder will determine the time required for a limiting movement of the piston toward and to the outer cylinder end 25 under the influence of a spring which constantly urges such a piston movement.

As particularly shown, the piston 28 includes a forward section 31 having angularly related flange and hub portions respectively, with the flange portion having its rim spaced slightly from the cylinder bore to permit the described valve action of the cup leather 29 during an inward piston movement. An element 32 is fixedly and sealedly mounted on the hub portion of the piston section 31 and has a radial flange portion spaced rearwardly from the flange of the section with the axially-inner and radially outer faces of the flanges clampedly engaging an inturned base portion of the cup leather 29 for operatively securing the cup leather in the piston assembly. In the present structure, the rigid elements making up the cylinder head assemblies are assumed to be secured to each other and within the cylinder ends by press-fit engagements, and the piston elements 31 and 32 are similarly secured in unitary association with the rod 19 and with each other respectively.

Opposite the hub portion of the piston element 31, the stop rod 19 is provided with a relatively small axial groove 33 constantly connecting the cylinder space portions at opposite sides of the piston, said groove comprising the before-mentioned bleeder duct with respect to the piston, and being the operative equivalent of such a duct through the piston or through the cylinder wall. The duct 33 provides a restricted passage of such cross-section that the outward movement of the peripherally sealed-in piston from an inner position thereof toward the outer cylinder head 25 will require a predetermined length of time in accordance with the viscosity of the liquid charge and the magnitude of the spring force which is constantly applied to urge an outward, and inoperative, disposal of the stop and piston rod 19 with respect to the operation control element which, in the present instance, comprises the valve disc 13.

An outer end portion of the rod 19 beyond the outer cylinder end 25 mounts cap-like element 34 of circular outline suitably fixed on its extremity with the element cavity directed toward the body 11, and the interior of the element 34 provides a seat 35 for the outer end of a helical compression spring 36 which freely receives the cylinder 23 and has its other end engaging a seat 37 provided by the body 11 adjacent and around the base of the cylinder-mounting collar 20. The strength of the spring 36 is preferably such that an appreciable outward thrust is operated against the rod 19 after the piston has engaged the outer cylinder end 25 for limiting the outward movement of the rod; in this manner, the piston-moving urge of the spring is arranged to be substantially constant during the full range of the piston movement permitted in the cylinder. For a reason to be hereinafter brought out, the element 34 and the mounting rod 19 are adjustably rotatable together, and the spring 36 is further operative at either or both of the seats 35 and 37 engaged by it to frictionally secure the element 34 in rotatively adjusted positions, about the rod axis.

It will now be particularly noted that, with the valve disc 13 sufficiently unseated by the application of the screw 17 against its stem 15, the normally withdrawn stop-rod 19 may be manually pushed inwardly by pressure exerted against the outer end of the element 34 to variably extend its inner end in the path of closing of the valve disc whereby a backing off of the valve-tilting screw 17 to allow a closing movement of the valve disc toward its seat 14 will laterally engage the inner side of the valve at its sealing sheath 16 with the inner end of the rod 19 to prevent a closing of the flow passage 12 by a setting of the valve disc until the rod 19 has been withdrawn from engagement with the valve disc through the action of the spring 36 under the timing control of the bleeder passage 33 in the described manner. In order to provide for a passage-opening disposal of the valve disc 13 for different predetermined lengths of time, an adjustable stop means is provided for variably limiting the permitted inward manual pushing of the stop-rod 19 for its subsequent timed withdrawal to provide a holding of the valve disc 13 in open position in the flow passage 12 for a period of time determined by the time required for the described automatic movement of the rod to finally release the valve disc for its pressure closing.

As particularly illustrated, a tubular skirt 38 extending from the rim of the cap element 34 has its inner radial edge 39 defining one turn of a spiral having the pitch of said turn equal to the maximum movement permitted for the rod 19 between its limiting positions with the ends of said spiral edge connected by an axial edge portion 40. The skirt portion 38 is arranged to constantly extend into an annular sleeve 41 which protrudes integrally from the side of the valve body 11 in coaxial relation to the collar extension 20. An axial rib 42 extending radially outwardly along the sleeve 41 has the outer end 42' thereof engageable as a stop by the cap skirt edge 39 whereby adjusted turnings of the cap element 34 about the rod axis determine different limiting distances of inward manual setting movements of the rod with respect to the unseated valve disc 13. Externally thereof, the sleeve 41 is provided with a radial rib 43 which extends to the free sleeve edge for positioning reference to a line of calibrations 44 provided around the rim of the outer face of the cap element 34; in the present instance, the indexing rib 43 is provided radially opposite the stop rib 42, and the calibrations 44 represent six successive ten-minute timing intervals from zero point which is designated at "60."

In general reference to the disclosed timing valve unit, it will be understood that the valve structure might be provided as a separate flow-control unit which may be used solely as an on-and-off valve independently of other valves in a flow-line in which it is interposed. Also, the present valve arrangement per se will operate in various spacial positions other than that shown in which the flow of the controlled stream is generally downwardly; if the valve is to be used in inverted position, a weak spring might be interposed in the upstream portion of the flow passage to operate against the valve disc to insure its seating under atmospheric pressure conditions. On the other hand, the stop-rod 19 of the assembly might be cooperatively applied with reference to another operation-control device than a valve disc whereby the stop-rod 19 and the associated spring-controlled hydraulic timing device for positioning it may function either to start or stop an operation of another sort. Also, the specifically disclosed arrangement has been particularly designed for providing a timed control for watering operations respecting lawns and gardens.

From the foregoing description taken in connection with the accompanying drawings, the advantages of the present device will be readily understood by those skilled in the art to which the invention appertains. While I have herein described the construction and use of a form of my invention which is now considered to comprise a particularly valuable application thereof, I desire to have it understood that the present disclosure is primarily illustrative, and that such changes and developments may be made, when desired, as fall within the scope of the following claims:

I claim:

1. In a valve for interposition in a confined fluid flow stream, a body providing a flow passage having an annular valve seat thereacross facing upstream with respect to the passage, a valve disc for sealedly engaging said seat, a stem extending axially from said valve disc and arranged to extend axially in the flow passage when the valve disc is in sealed engagement with said seat, a normally non-operating member projectible laterally against the stem to releasably tilt the valve disc from its passage-closing position to provide an open condition of the flow passage at the valve, a reciprocable stop member directly engageable against the seat-engaging face of the tilted valve disc radially thereof at its downstream side for preventing a seating of the disc against the seat when the first member is withdrawn, means adjustable to adjust the permitted degree of insertion of the stop member between the valve disc and the seat, a spring means constantly urging the withdrawal of the stop member and a hydraulic means resisting the action of the spring means to provide for the withdrawal of the stop member at a fixed predetermined movement rate.

2. In a valve for interposition in a confined fluid flow stream, a body providing a flow passage having an annular valve seat thereacross, a valve disc arranged for a normal sealed engagement with said seat by reason of the stream pressure, means manually operative to unseat the valve disc for opening the flow passage thereat, a stop member mounted on the valve body and comprising a longitudinally reciprocable rod element extending radially of the valve seat and having an end portion thereof disposable between the displaced valve disc and the seat for preventing a seating of the disc on the seat when the first means is not operating, and a timer means automatically operative to withdraw the stop member after a predetermined period of time to then permit a closing of the valve, said timer means comprising a closed cylinder containing a liquid mounted on said body and having said rod element extending axially and sealedly through and from the cylinder ends, a piston fixedly mounted on the rod within said cylinder for reciprocation through the liquid therein and having means arranged for its relatively free movement toward the axis of the valve and its relatively retarded movement away from said axis, and a spring means constantly cooperative between the body and rod for urging a withdrawn relation of the rod with respect to the valve disc.

3. A structure in accordance with claim 2 in which the piston is provided with a cup leather for permitting its relatively free movement solely toward the axis of the valve, and a relatively small duct in the piston- and cylinder-assembly constantly connects the portions of the cylinder space at opposite sides of the piston for limiting the return flow of the liquid in the cylinder between said cylinder space portions to provide a retarded return movement of the piston and rod under the urge of the spring means.

4. A structure in accordance with claim 2 having a cap-like member mounted on the outer end of the rod element and provided with a skirt portion extending toward the valve axis and having its free edge defining a helix portion, and means on the body providing a fixed stop for engagement by said skirt edge whereby to adjustably limit the movement of the stop rod element opposite the displaced valve disc in accordance with the rotatably adjusted setting of the cap member with respect to said stop provided by the body.

5. In combination with a device having an operation-control element and means for displacing said element from a normal position to a displaced position, a reciprocable stop rod member arranged for the removably adjusted engagement of a forward end portion thereof along an opposed face of the displaced said element to maintain the element in its displaced position, and a timer means automatically operative to progressively withdraw the stop member from its engagement with said face of the control element after a predetermined period of time to then permit a return of the element to its normal position, said timer means comprising a closed cylinder containing a liquid and having said rod element extending axially and sealedly through and from both cylinder ends, a piston mounted on the rod within said cylinder and having means provided for its relatively free forward movement to its operative position under manual pressure exerted against the rearward rod end and its relatively retarded rearward movement away from its operative position, a spring means constantly urging the rearward disposal of the rod, and a constantly available stop means which is manually adjustable to limit the permitted forward manual setting movement of the stop rod for timing its disengagement from the control element under the action of the spring.

6. A structure in accordance with claim 5 in which the stop means comprises a cap-like member mounted on the outer end of the stop rod member and provided with a skirt portion extending about the cylinder and having its free edge defining a helix portion, and means on the cylinder providing a fixed stop for engagement by said skirt edge whereby to adjustably limit the movement of the stop rod member opposite the displaced operation-control element in accordance with the rotatably adjusted setting of the cap member with respect to said stop provided by the cylinder.

References Cited in the file of this patent

UNITED STATES PATENTS

| | | |
|---|---|---|
| 258,432 | Keith | May 23, 1882 |
| 1,063,230 | Watrous | June 3, 1913 |
| 1,096,220 | Brooks | May 12, 1914 |
| 1,645,763 | Lundberg | Oct. 18, 1927 |
| 1,855,106 | Gonyk | Apr. 19, 1932 |